UNITED STATES PATENT OFFICE.

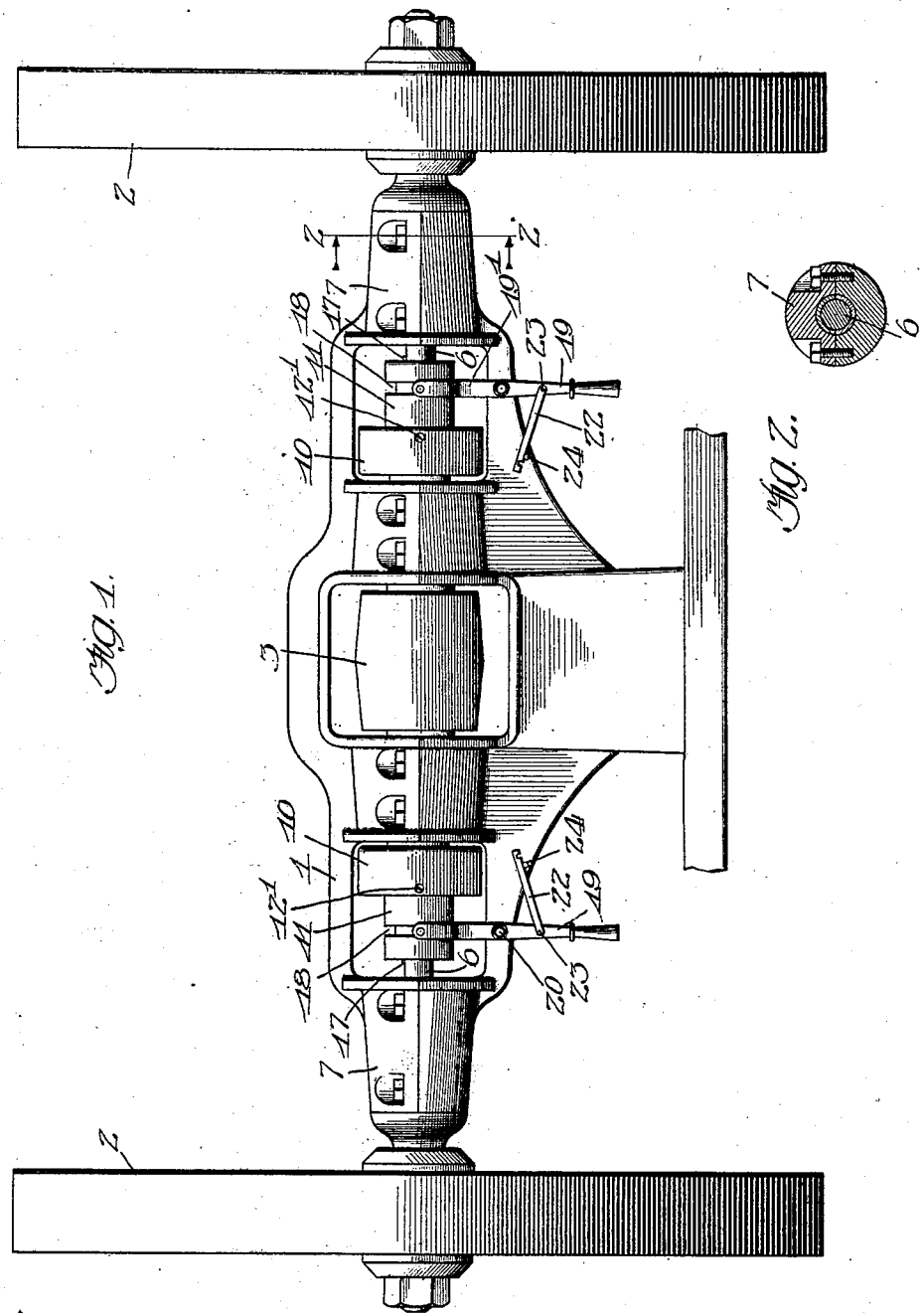

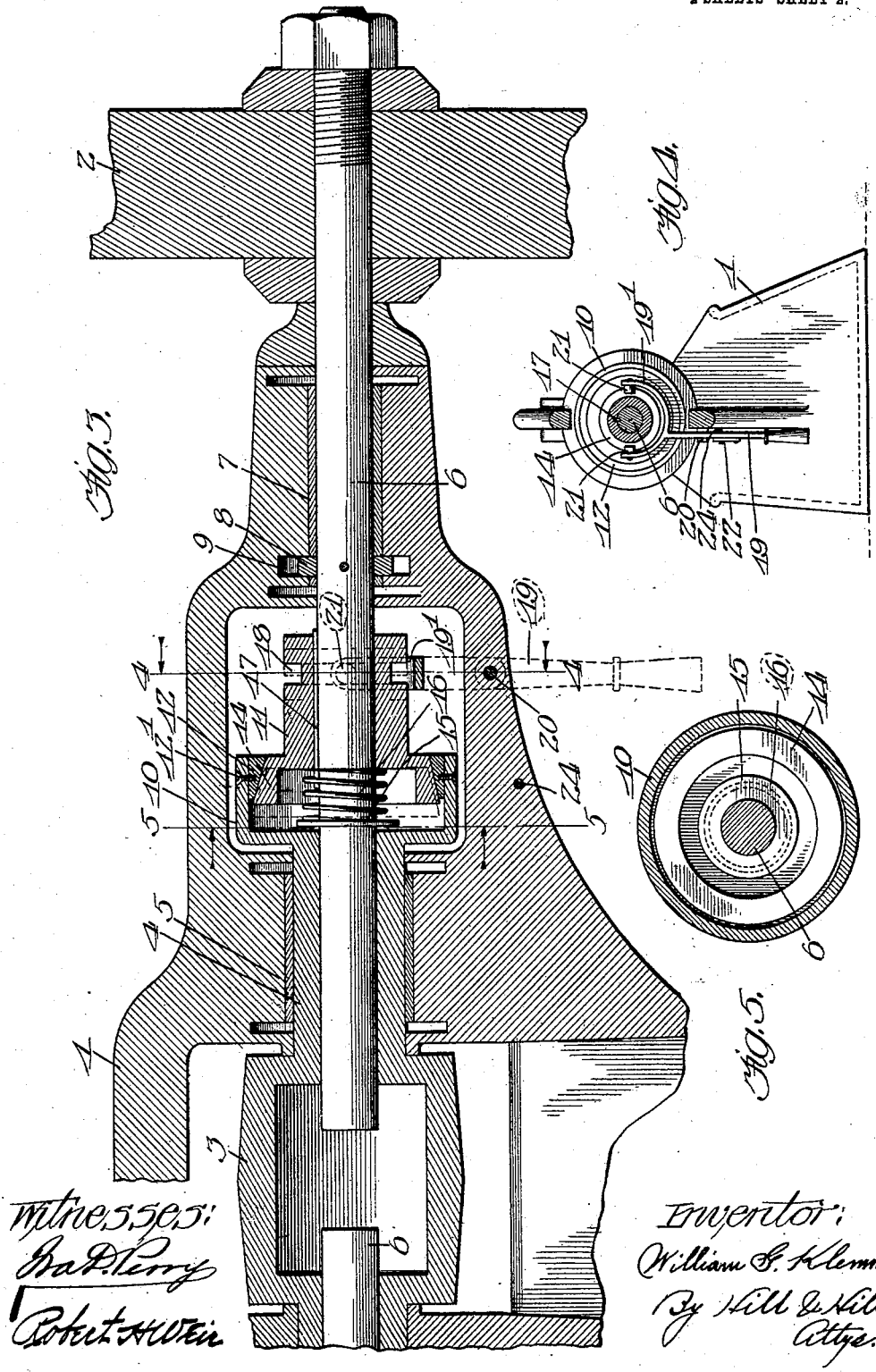

WILLIAM G. KLEMM, OF CHICAGO, ILLINOIS, ASSIGNOR TO EMIL R. KLEMM, OF CHICAGO, ILLINOIS.

GRINDING-MACHINE OR THE LIKE.

No. 915,298.      Specification of Letters Patent.      Patented March 16, 1909.

Application filed June 24, 1907. Serial No. 380,437.

*To all whom it may concern:*

Be it known that I, WILLIAM G. KLEMM, a citizen of the United States, residing at Chicago, county of Cook, and State of Illinois, have invented certain new and useful Improvements in Grinding-Machines or the Like, of which the following is a description.

My invention relates to that class of devices known as grinding or polishing machines and similar devices wherein grinding, polishing or buffing wheels are mounted upon rotatable spindles and associated with suitable means for operating the same.

The object of my invention is to provide a simple, convenient and serviceable device of the kind described, and to this end my invention consists in the novel construction, arrangement, and combination of parts, herein shown and described and more particularly pointed out in the claims.

In the accompanying drawings, wherein like or similar reference characters indicate like or corresponding parts, Figure 1 is a side elevation of my device, Fig. 2 is a section taken substantially on line 2—2 of Fig. 1. Fig. 3 is a vertical section taken substantially longitudinally of the center line of the wheel shafts or arbors of the device. Fig. 4 is a section taken substantially on line 4—4 of Fig. 3 and Fig. 5 is a section taken substantially on line 5—5 of Fig. 3.

In the preferred form of my device shown in the drawings, a frame 1 is provided at opposite sides of which, provision is made for mounting any desired form of grinding or buffing wheels 2—2. A suitable driver 3 is provided at a point between the wheels for operating the same. The several parts are preferably so arranged that either of the shafts or arbors upon which the wheels 2 are mounted may be rotated as desired. In the form shown, the driver 3 is provided with journals 4—4 formed upon its opposite sides adapted to coöperate with suitable bearings 5—5 in the frame 1.

The shafts or arbors 6 carrying the wheels 2 may be rotatably mounted upon the frame 1 in any suitable manner. As shown, the shafts 6 are mounted upon the frame 1 in axial alinement, with their proximate ends slightly separated and supported in suitable bearings formed in the journals 4. The outer ends of the shafts are preferably supported in suitable bearings 7 formed integral with the frame 1, thus supporting each shaft or arbor 6 jointly upon the driver and the frame. Obviously when so constructed, the shafts 6 and driver 3 must be positioned concentrically with each other, that is, the axes of the shafts coincide with the axis of the driver. Suitable means are also preferably provided for controlling the longitudinal position of the shafts. As shown, a collar 8 is rigidly secured to each shaft 6 arranged to coöperate with a suitable recess 9 in the bearings 7 for this purpose. In the form shown, also, the various bearings of my device are of the usual plain form and may be lubricated in any suitable manner, but it is obvious, that any preferred form of bearings in which one or more of the well known ring, chain or capillary oiling devices are provided, may be employed if desired. The particular form of bearing or oil distribution, however, forms no part of my present invention and no description of the same is necessary.

Any suitable means may be provided for rotatively connecting the shafts 6—6 with the driver 3. In the form shown, each of the journals 4 is provided with a friction clutch mechanism comprising a recessed member 10, rigidly attached thereto, or formed integral therewith, and a longitudinally movable part 11 upon each shaft 6 adapted to coöperate with its particular part 10 to rotatively connect the driver to that particular shaft 6. As shown, an internally tapering ring 12 is attached to the interior of the part 10 at its outer edge by means of suitably formed screws 12' or equivalent means and the part 11 is provided with a conical portion 14, the exterior of which is tapered to correspond with the taper of the interior of the part 12, the parts 12 and 14 being so formed that they may be brought into frictional engagement with each other when desired or by slight longitudinal movement of the part 11 they may be entirely disengaged, releasing the particular shaft 6 from the driver 3.

In the preferred construction shown, a washer or collar 15 is provided upon the shaft 6 in the space between the parts 10 and 11 and a suitable spring 16 is provided extending from the collar 15 to the part 11 tending to normally force the part 11 longitudinally of the shaft and hold the parts 14 and 12 in operative engagement. It is, of course, understood that the part 11 is provided with a suitable slot, featherway, or equivalent means adapted to coöperate with a feather 17 or other suitable means upon the shaft 6 to prevent rotation between the shaft and the part 11, while permitting free longitudinal movement between them.

Any suitable mechanism may be provided for manually disengaging the parts 12 and 14. As shown, an annular groove 18 is provided in the part 11. A lever 19 is pivotally mounted upon the frame 1 at 20 and provided with a forked part 19' having suitable projections 21—21 or equivalent means attached thereto to engage the annular groove 18 so that the lever 19 may be operated to move the part 11 and associated part 14 to control the operation of the connecting mechanism between the driver 3 and each shaft 6. Obviously when so constructed the spring 16 will tend to force the parts 12 and 14 into engagement as soon as the lever 19 is released. In case it is desirable to prevent such engagement suitable means may be provided to engage the lever 19 or associated parts and hold the part 11 in any desired position upon the shaft. In the form shown, a hook 22 is pivotally mounted upon the lever 19 at 23 with a part adapted to engage a pin 24 or other suitable means upon the frame 1 for this purpose.

Obviously when constructed as hereinbefore described, either or both of the wheels 2—2 may be connected to the driver 3 whenever desired and when so connected any vibration of the machine or other disturbing condition will have no tendency to disconnect them. When desired however, they may be independently disconnected from the driver and the mechanism locked in position so that there will be no probability of accidental reengagement. An important feature of the device, permitting the same to be made very much more compact and convenient is the mounting of the driver 3 upon the frame 1 entirely independently of the shafts 6 each of which are then mounted jointly upon the frame and the driver.

It is believed that the foregoing description clearly explains the operation of the device and that no further description of its operation is necessary.

Having thus described my improvement, it is obvious that various immaterial modifications may be made in my device without departing from the spirit of my invention, hence, I do not wish to be understood as limiting myself to the exact form and construction shown.

What I claim as new and desire to secure by Letters Patent is,

1. In a device of the kind described, a frame, a shaft rotatably mounted upon said frame, a driver rotatably mounted upon said frame independently of, but concentric to said shaft, mechanism for rotatively connecting said shaft and driver, means upon the frame for controlling the longitudinal position of the shaft and means for controlling the operation of said connecting means.

2. In a device of the kind described, a frame, a rotatable driver mounted upon said frame, a shaft rotatably mounted upon said frame concentric to the axis of said driver, mechanism for rotatively connecting said driver and said shaft, means upon the frame for controlling the longitudinal position of the shaft and means for controlling the operation of said connecting means.

3. In a device of the kind described, a frame, a rotatable driver mounted upon said frame, a shaft rotatably mounted jointly upon said driver and said frame concentric to the axis of said driver, mechanism for rotatively connecting said driver and said shaft, and means for controlling the operation of said connecting means.

4. In a device of the kind described, a frame and a rotatable driver provided with a journal at each side mounted upon said frame, a shaft with one end inclosed by said driver and rotatably mounted upon said frame concentric to the axis of said driver, mechanism for rotatively connecting said driver and said shaft, and means for controlling the operation of said connecting means.

5. In a device of the kind described, a frame, a rotatable driver provided with a journal at each side formed integral therewith, a shaft with one end inclosed by said driver, partially supported thereby, and rotatably mounted upon said frame concentric to the axis of said driver, mechanism for rotatively connecting said driver and said shaft, and means for controlling the operation of said connecting means.

6. In a device of the kind described, a frame, a rotatable driver mounted upon said frame, a shaft rotatably mounted upon said frame, concentric to the axis of, and with one end supported by, said driver, friction clutch mechanism for rotatively connecting said driver and said shaft, and means for controlling the operation of said connecting means.

7. In a device of the kind described, a frame, a rotatable driver mounted upon said frame, a shaft rotatably mounted upon said frame concentric to the axis of, and with one end supported by, said driver, a part rigidly connected to said driver, and a coöperating part slidably mounted upon said shaft, for rotatively connecting said driver and said shaft, and means for controlling the operation of said connecting means.

8. In a device of the kind described, a frame, a rotatable driver mounted upon said frame, a shaft rotatably mounted upon said frame concentric to the axis of, and with one end supported by, and inclosed in, said driver, mechanism for rotatively connecting said driver and said shaft, means for normally holding said connecting means in engagement, and means for disengaging the same when desired.

9. In a device of the kind described, a frame, a rotatable driver mounted upon said frame, a shaft rotatably mounted upon said frame concentric to the axis of said driver, mechanism for rotatively connecting said driver and said shaft, means upon the frame for controlling the longitudinal position of the shaft, resilient means for normally holding said connecting means in engagement, and means for disengaging the same when desired.

10. In a device of the kind described, a frame, a rotatable driver provided with a journal at each side mounted upon said frame, a shaft rotatably mounted jointly upon said driver and said frame concentric to the axis of said driver, mechanism for rotatively connecting said driver and said shaft, and means for controlling the operation of said connecting means.

11. In a device of the kind described, a frame, a rotatable driver provided with a journal at each side mounted upon said frame, a shaft rotatably mounted jointly upon said driver and said frame concentric to the axis of said driver, friction clutch mechanism for rotatively connecting said driver and said shaft, and means for controlling the operation of said connecting means.

12. In a device of the kind described, a frame, a rotatable driver provided with a journal at each side mounted upon said frame, a shaft rotatably mounted jointly upon said driver and said frame concentric to the axis of said driver, friction clutch mechanism for rotatively connecting said driver and said shaft, comprising a part rigidly connected to said driver, and a coöperating part slidably mounted upon said shaft, and means for controlling the operation of said connecting means.

13. In a device of the kind described, a frame, a rotatable driver provided with a journal at each side mounted upon said frame, a shaft rotatably mounted jointly upon said driver and said frame concentric to the axis of said driver, friction clutch mechanism for rotatively connecting said driver and said shaft, comprising a part rigidly connected to said driver, and a coöperating part slidably mounted upon said shaft, means for normally holding said connecting means in engagement, and means for disengaging the same when desired.

14. In a device of the kind described, a frame, a rotatable driver provided with a journal at each side formed integral therewith mounted upon said frame, a shaft rotatably mounted jointly upon said driver and said frame concentric to the axis of said driver, friction clutch mechanism for rotatively connecting said driver and said shaft, comprising a part rigidly attached to one of said journals, and a coöperating part slidably mounted upon said shaft, resilient means for normally holding said connecting means in engagement, and means for disengaging the same when desired.

15. In a device of the kind described, a frame, a rotatable driver provided with a journal at each side formed integral therewith, mounted upon said frame, a shaft rotatably mounted jointly upon said driver and said frame concentric to the axis of said driver, a part rigidly attached to one of said journals, and a coöperating part slidably mounted upon said shaft for rotatively connecting said driver and said shaft, and means for controlling the operation of said connecting means.

16. In a device of the kind described, a frame, a rotatable driver provided with a journal at each side mounted upon said frame, a shaft rotatably mounted jointly upon said frame and driver concentric to the axis of said driver, a part formed integral with said driver and a coöperating part slidably mounted upon said shaft for rotatively connecting said driver and said shaft, and means for controlling the operation of said connecting means.

17. In a device of the kind described, a frame, a rotatable driver provided with a journal at each side mounted upon said frame, a shaft rotatably mounted jointly upon said driver and said frame concentric to the axis of said driver, a part rigidly attached to one of said journals and a coöperating part slidably mounted upon said shaft for rotatively connecting said driver and said shaft, and means for controlling the operation of said connecting means.

18. In a device of the kind described, a frame, a rotatable driver provided with a journal at each side mounted upon said frame, a shaft rotatably mounted jointly upon said frame and driver concentric to the axis of said driver friction clutch mechanism for rotatably connecting said driver and said shaft and means for controlling the operation of said connecting means.

19. In a device of the kind described, a frame, a rotatable driver provided with a journal at each side mounted upon said frame, a shaft rotatably mounted jointly upon said frame and driver concentric to the axis of said driver, friction clutch mechanism for rotatively connecting said driver and said shaft, means for normally holding said clutch mechanism in engagement, and means for disengaging the same when desired.

20. In a device of the kind described, a frame, a pair of axially alined shafts rotatably mounted upon said frame, a driver rotatably mounted upon said frame independently of but concentrically to, said shafts, mechanism for independently connecting each of said shafts to said driver, and means for independently controlling the operation of said connecting means.

22. In a device of the kind described, a frame, a rotatable driver mounted upon said frame, a pair of axially alined shafts rotatably mounted jointly upon said driver and said frame concentric to the axis of said driver, mechanism for rotatively connecting said driver and said shaft, and means for controlling the operation of said connecting means.

22. In a device of the kind described, a frame, a rotatable driver provided with a journal at each side mounted upon said frame, a pair of axially alined shafts rotatably mounted upon said frame concentric to the axis of said driver, mechanism for rotatively connecting said driver to said shafts, and means for controlling the operation of said connecting means.

23. In a device of the kind described, a frame, a rotatable driver provided with a journal at each side formed integral therewith, mounted upon said frame, a pair of axially alined shafts rotatably mounted upon said frame concentric to the axis of said driver, a part rigidly attached to each of said journals, and coöperating parts slidably mounted upon said shafts, for rotatively connecting said driver to said shafts, and means for independently controlling the operation of said connecting means.

24. In a device of the kind described, a frame, a rotatable driver provided with a journal at each side formed integral therewith, mounted upon said frame, a pair of axially alined shafts rotatably mounted upon said frame concentric to the axis of said driver, parts formed integral with said driver, and coöperating parts slidably mounted upon said shafts, for rotatively connecting said driver to each shaft, and means for independently controlling the operation of said connecting means.

25. In a device of the kind described, a frame, a rotatable driver provided with a journal at each side mounted upon said frame, a pair of axially alined shafts rotatably mounted jointly upon said driver and said frame concentric to the axis of said driver, a part rigidly attached to each of said journals, and coöperating parts slidably mounted upon said shafts for rotatively connecting said driver and said shafts, and means for controlling the operation of said connecting means.

26. In a device of the kind described, a frame, a rotatable driver provided with a journal at each side formed integral therewith mounted upon said frame, a pair of axially alined shafts rotatably mounted jointly upon said driver, and said frame, concentric to the axis of said driver, a part rigidly attached to each of said journals, and a coöperating part slidably mounted upon each of said shafts for rotatively connecting said driver to said shafts, resilient means for normally holding said connecting means in engagement, and means for disengaging the same when desired.

In testimony whereof, I have hereunto signed my name in the presence of two witnesses.

WILLIAM G. KLEMM.

Witnesses:
  BURTON U. HILLS,
  CHARLES I. COBB.